United States Patent
Wenger

(10) Patent No.: US 9,104,704 B2
(45) Date of Patent: Aug. 11, 2015

(54) IMAGING SYSTEMS AND RELATED METHODS

(75) Inventor: Scott Wenger, Raleigh, NC (US)

(73) Assignee: HTC CORPORATION, Taoyuan County, Taoyuan (TW)

(*) Notice: Subject to any disclaimer, the term of this patent is extended or adjusted under 35 U.S.C. 154(b) by 442 days.

(21) Appl. No.: 13/549,987

(22) Filed: Jul. 16, 2012

(65) Prior Publication Data

US 2014/0015979 A1  Jan. 16, 2014

(51) Int. Cl.
| | |
|---|---|
| H04N 7/18 | (2006.01) |
| H04N 5/225 | (2006.01) |
| G06K 9/00 | (2006.01) |
| G06K 9/54 | (2006.01) |
| G06K 9/60 | (2006.01) |
| H04W 24/00 | (2009.01) |
| G06T 11/20 | (2006.01) |
| G06Q 30/00 | (2012.01) |
| G06F 17/30 | (2006.01) |
| H04W 4/02 | (2009.01) |
| H04W 4/20 | (2009.01) |
| H04N 21/2665 | (2011.01) |

(52) U.S. Cl.
CPC ......... *G06F 17/30265* (2013.01); *H04W 4/023* (2013.01); *H04W 4/206* (2013.01); *H04N 21/2665* (2013.01)

(58) Field of Classification Search
CPC . H04W 4/206; H04W 4/023; G06F 17/30265
See application file for complete search history.

(56) References Cited

U.S. PATENT DOCUMENTS

| | | | | |
|---|---|---|---|---|
| 7,730,036 | B2* | 6/2010 | Blose et al. | 707/661 |
| 2009/0089294 | A1* | 4/2009 | Davis et al. | 707/10 |
| 2009/0233623 | A1* | 9/2009 | Johnson | 455/456.3 |
| 2009/0319472 | A1* | 12/2009 | Jain et al. | 707/2 |
| 2010/0128919 | A1* | 5/2010 | Perronnin et al. | 382/100 |
| 2012/0027256 | A1* | 2/2012 | Kiyohara et al. | 382/103 |
| 2012/0113121 | A1* | 5/2012 | Luo et al. | 345/440 |
| 2013/0011083 | A1* | 1/2013 | Berkovich et al. | 382/305 |
| 2013/0073388 | A1* | 3/2013 | Heath | 705/14.53 |
| 2014/0129942 | A1* | 5/2014 | Rathod | 715/720 |
| 2014/0226855 | A1* | 8/2014 | Savvides et al. | 382/103 |

FOREIGN PATENT DOCUMENTS

WO   2011/101849 A1   8/2011

OTHER PUBLICATIONS

German Office Action dated Apr. 5, 2013.

* cited by examiner

*Primary Examiner* — Jefferey Harold
*Assistant Examiner* — Sean Haiem
(74) *Attorney, Agent, or Firm* — McClure, Qualey & Rodack, LLP

(57) ABSTRACT

Imaging systems and related methods are provided. A representative system includes: a network identification system operative to identify image capturing devices operating within a vicinity of each other; an image cataloging system operative to receive image data, via a communication network, from at least a first image capturing device and a second image capturing device identified as operating within the vicinity of each other, the image cataloging system being further operative to automatically catalog the received image data; and a content feed system operative to receive, via the communication network, a request for a compilation of image data and, responsive thereto, create the compilation of image data such that the compilation of image data includes at least a portion of the image data received from each of the first image capturing device and the second image capturing device.

20 Claims, 4 Drawing Sheets

IMAGING SYSTEMS AND RELATED METHODS

TECHNICAL FIELD

The present disclosure generally relates to the presentation of image data.

BACKGROUND

Image capturing devices (such as stand-alone digital cameras and those implemented onboard phones, for example) are highly useful in acquiring image data. Due to the prevalence of such devices, it is also quite common to have multiple image capturing devices in a given area at the same time. However, these devices typically are independently operated, and users of the devices are typically limited in their ability to gain access to image data acquired by other devices.

SUMMARY

Imaging systems and related methods are provided. Briefly described, one embodiment, among others, is an imaging system comprising: a network identification system operative to identify image capturing devices operating within a vicinity of each other; an image cataloging system operative to receive image data, via a communication network, from at least a first image capturing device and a second image capturing device identified as operating within the vicinity of each other, the image cataloging system being further operative to automatically catalog the received image data; and a content feed system operative to receive, via the communication network, a request for a compilation of image data and, responsive thereto, create the compilation of image data such that the compilation of image data includes at least a portion of the image data received from each of the first image capturing device and the second image capturing device.

Another embodiment is a method for providing images comprising: receiving, via a communication network, first image data from a first image capturing device corresponding to a subject and second image data from a second image capturing device corresponding to the subject; forming a compilation of image data of the subject containing at least some of the first image data and at least some of the second image data; and providing, via a communication network, the compilation of image data for viewing.

Another embodiment is a method for providing images comprising: receiving, via a communication network, image data from multiple image capturing devices corresponding to multiple subjects; receiving, via the communication network, information corresponding to a request for image data corresponding to a first of the subjects; and responsive to the request, automatically forming a compilation of image data of the first of the subjects containing image data acquired from at least two of the image capturing devices.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
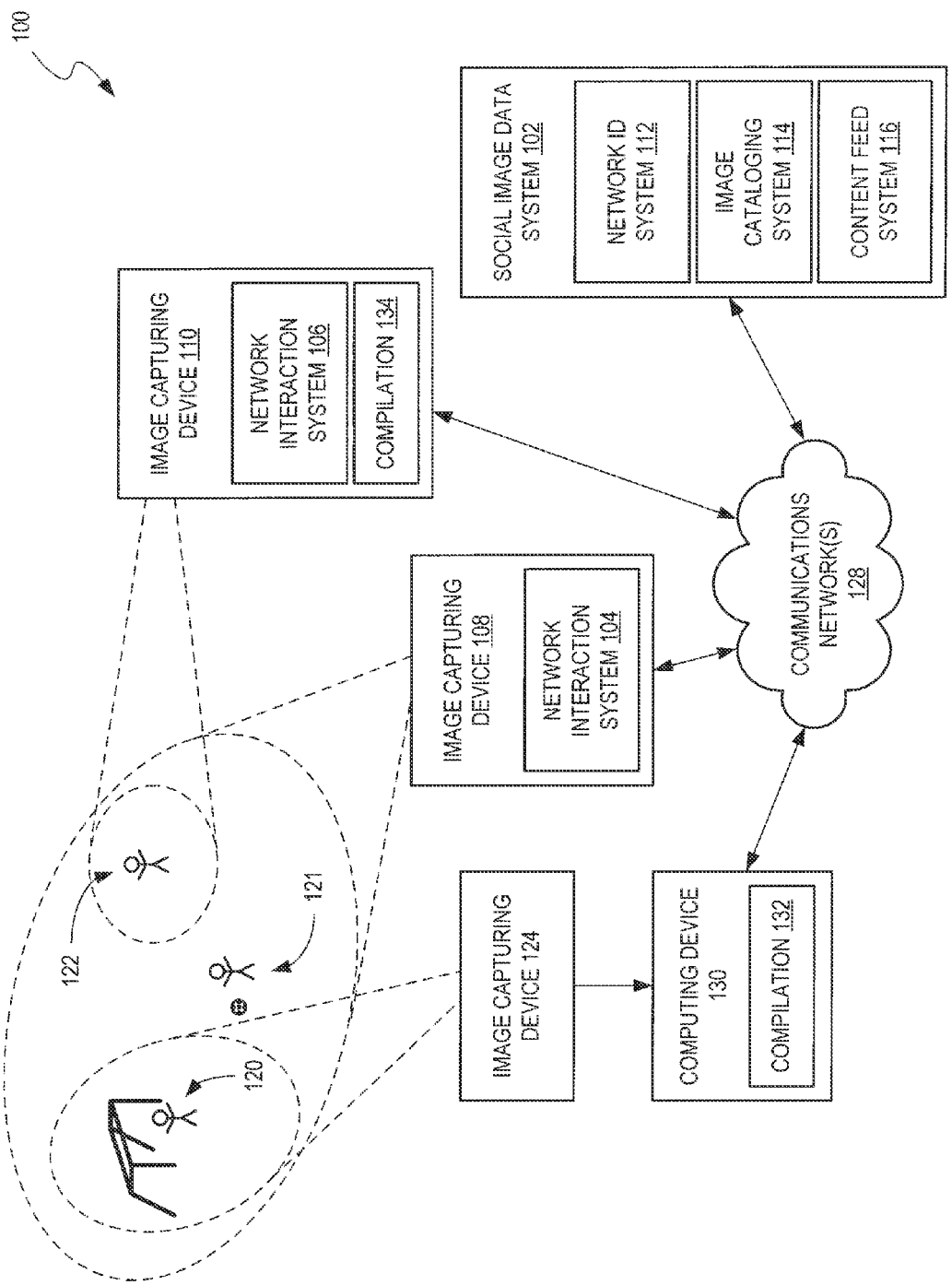
FIG. 1 is a schematic diagram of an example embodiment of an imaging system.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

In this regard, imaging systems and related methods are provided, some embodiments of which involve the use of image data related to a common subject that are provided by multiple image capturing devices. For instance, the common subject may relate to an event (e.g., a sporting event), a particular object of interest (e.g., a building), or a locality (e.g., downtown Chicago), among countless others. Although typically operated independently, the image capturing devices may interact with the imaging system to facilitate storing of the independently acquired image data and sharing of the image data among a network of users. In some embodiments, users of the image capturing devices are notified of the presence of each other responsive to the imaging system determining that the image capturing devices are in a vicinity of each other and, thus, likely to be acquiring image data associated with a common subject. Such a notification may tend to prompt a user of one of the image capturing devices to interact with the imaging system for uploading and/or later downloading image data. In some embodiments, image data may be automatically uploaded from an image capturing device to the imaging system.

In some embodiments, an imaging system ensures that information is associated with received image data to allow for cataloging of the image data. For instance, information corresponding to time and/or location of acquisition, as well as an identity of subjects within the image data, may be used. Such information may be used to facilitate the creation of compilations of the image data that was acquired by multiple image capturing devices. As such, image data may be made available to a user that the user did not acquire with an image capturing device, but which may have been acquired by another image capturing device that was acquiring the image data related to a common subject from another vantage point or viewing perspective.

In this regard, FIG. 1 is a schematic diagram of an example embodiment of an imaging system. As shown in FIG. 1, imaging system 100 includes a social image data system 102 and network interaction systems 104, 106, which are resident on image capturing devices 108, 110, respectively. In this embodiment, social image data system 102 incorporates a network identification system 112, an image cataloging system 114 and a content feed system 116.

Represented in FIG. 1 is an event (in this case, a sporting event) at which multiple players (e.g., players 120, 121 and 122) are participating. Although not depicted, various spectators of the event also are present, with several of the spectators using image capturing devices. For example, an image capturing device 124 is depicted in addition to devices 108 and 110, which were mentioned previously. In contrast to devices 108 and 110, which communicate with social image data system 102 via a communications network 128, image capturing device 124 communicates image data to a computing device 130, which communicates with social image data system 102 via communications network 128. It should be noted that communications network 128 may include one or more of wired and/or wireless networks and may use various protocols for communicating information.

Image capturing devices 108, 110 and 124 are used to acquire image data associated with the depicted event. Specifically, device 108 is currently acquiring image data (e.g., still images and/or movies) corresponding to players 120, 121 and 122, device 110 is acquiring image data corresponding to player 122, and device 124 is acquiring image data corresponding to player 120. Also, note that the image capturing devices are in a vicinity of each other while each acquires image data from a different viewing perspective.

In this embodiment, use of imaging system 100 enables the users of devices 108 and 110 to be informed of the presence of each other at the event. In particular, network interaction systems 104 and 106 provide information corresponding to the identifications and locations of the devices 108, 110 to network identification system 112. In response, the network identification system monitors whether devices about which information is received (e.g., devices that are registered with the imaging system) are operating in a vicinity of each other. If so, the network identification system provides information back to the devices informing each of the presence of the other. This information may be useful in prompting a user of one of the devices to seek additional image data associated with the event as will be described later. Regardless of whether or not a user is informed of the presence of another image capturing device, image data acquired by such a device may be provided to social image data system 102 (e.g., automatically or responsive to additional user interaction). In some embodiments, network identification system 112 may perform an access operation, in which control is provided over which network users may request or download image compilations. For instance, such request may be restricted to users who provided data for the compilation.

Responsive to receiving image data, image cataloging system 114 catalogs the image data. In some embodiments, this may involve associating descriptors with the image data and then storing the image data. In this regard, descriptors may include information corresponding to time and/or location of acquisition, as well as an identity of subjects (i.e., content of interest) within the image data. In some embodiments, the descriptors may be in the form of metadata, although various other types of configurations may be used, such as those embedded within the image data or contained in a separate file, for example. Such information may be used to facilitate the creation of compilations of image data from multiple image capturing devices.

Content feed system 116 is operative to provide compilations of image data acquired from one or more image capturing devices. In some embodiments, this involves receiving information corresponding to a request for a compilation, which may identify content of interest that is to be the focal point of the compilation. Responsive to the request, the content feed system accesses the stored image data and creates a compilation that attempts to comply with the request. For instance, if a request is received for a compilation that exhibits player 121 as the focal point, the content feed system may be able to use image data received from image capturing devices 108 and 124, whereas if the soccer game (e.g., the soccer ball) is to be the focal point, image data from all of the depicted image capturing devices may be used.

In some embodiments, a request for compilation may be made by any involved user by uploading an image of the desired focal point, and then allowing the system to compare the uploaded image to sample frames of each feed for a match to the desired focal point. In the case of a match, the feed in question may be incorporated in the output compilation. A request may also be for an aggregate or average focal point. In this way, a user simply interested in obtaining as much video of the event as possible may receive all relevant feeds for the event. A user may also request feeds that are similar or intentionally different from their own to be included in the compilation in some embodiments.

In forming a compilation, various techniques may be used. By way of example, image data acquired from various devices may be synchronized and selectively used to create a chronological sequence of image data. Additionally, or alternatively, image data acquired from various devices may be used to form composite frames of image data, such as by stitching portions of separate frames of image data together. Various 3D or multi-perspective viewing formats also may be accommodated in some embodiments due to the multi-perspective nature of the image capture.

In some embodiments, a compilation may incorporate simultaneous video feed from multiple sources, similar to a multi-camera DVD segment, for example. A slide show of still frames from various feeds that show the subject of interest also may be used. Additionally, a compilation may include a time-aligned audio feed from one device (for example, an ideally-located microphone at a concert) coupled with a video feed from another vantage point.

Regardless of how a compilation is formed, information corresponding to the compilation may be made available by the content feed system. In the embodiment of FIG. 1, compilations 132, 134 are depicted. Notably, compilation 132 has been downloaded onto computing device 130. In contrast, compilation 134 is being steamed to image capturing device 110, which in this embodiment is implemented as a feature of a smartphone. Each of these compilations includes image data associated with the soccer game that may be customized based on user preferences.

It should be noted that the image capturing devices may be configured to capture audio data, which may be used in a compilation. In other embodiments, one or more audio capturing devices may be used to perform this function.

Figure 2:
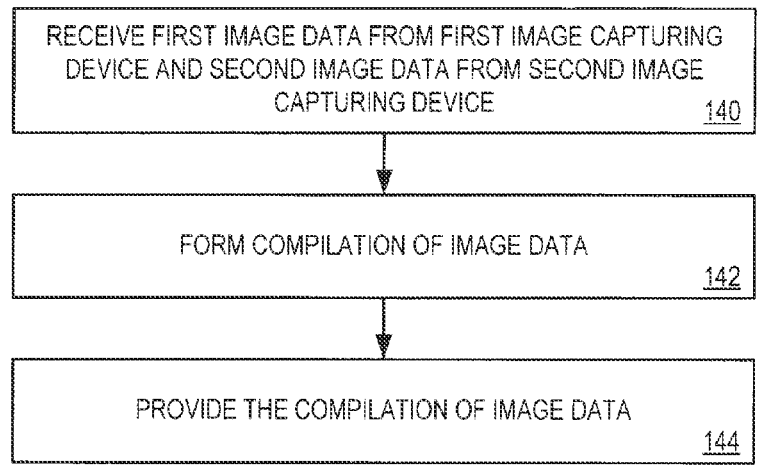
FIG. 2 is a flowchart depicting an example embodiment of a method for providing images.

FIG. 2 is a flowchart depicting an example embodiment of a method for providing images, such as may be performed by the imaging system of FIG. 1. As shown in FIG. 2, the method may be construed as beginning at block 140, in which first image data from a first image capturing device and second image data from a second image capturing device are received via a communications network. Notably, the received image data from both devices corresponds to a common subject, such as may be acquired when the image capturing devices are in a vicinity of each other. In block 142, a compilation of image data is formed. Notably, the compilation contains at least some of the first image data and at least some of the second image data. Thereafter, such as depicted in block 144, the compilation of image data is provided for viewing.

Figure 3:
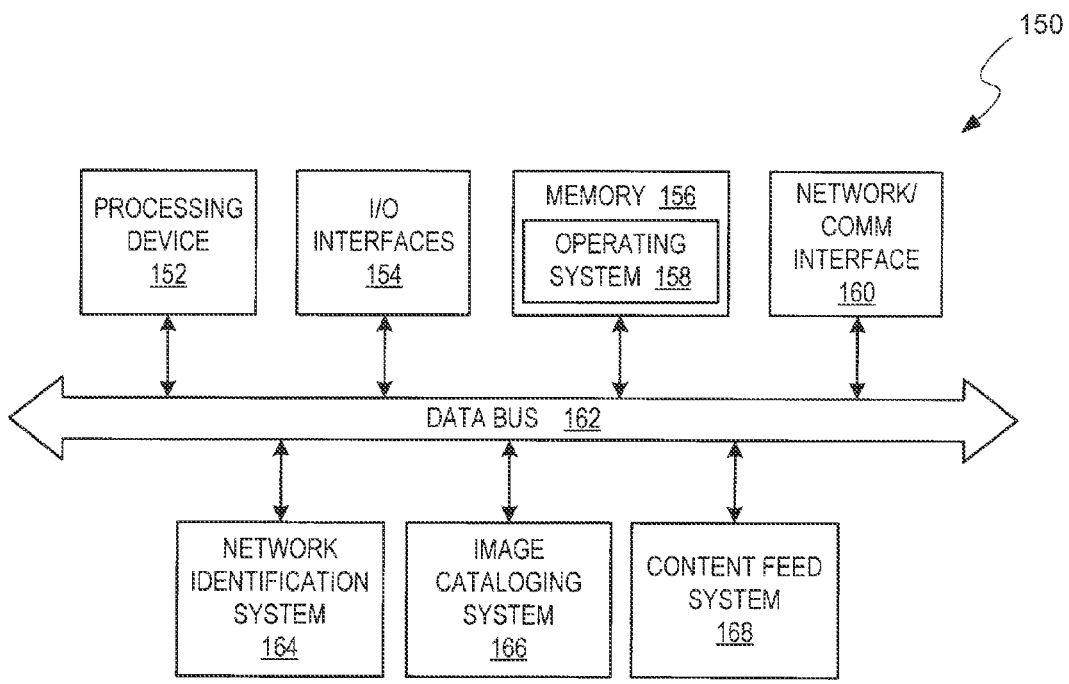
FIG. 3 is a schematic diagram of an example embodiment of a social image data system.

FIG. 3 is a schematic diagram of an example embodiment of a social image data system. As shown in FIG. 3, social image data system 150 includes a processing device (processor) 152, input/output interfaces 154, a memory 156, operating system 158 and a network/communication interface 160, with each communicating across a local data bus 162. Additionally, the system incorporates a network identification system 164, an image cataloging system 166 and a content feed system 168.

The processing device 152 may include a custom made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 156 may include any one of a combination of volatile memory elements (e.g., random-access memory (RAM, such as DRAM, and SRAM, etc.)) and nonvolatile memory elements. The memory typically comprises native operating system 158, one or more native applications, emulation systems, or emulated applications for any of a variety of operating systems and/or emulated hardware platforms, emulated operating systems, etc. For example, the applications may include application specific software which may comprise some or all the components of the system. In accordance with such embodiments, the components are stored in memory and executed by the processing device.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device.

With further reference to FIG. 3, network/communication interface 154 comprises various components used to transmit and/or receive data over a networked environment. By way of example, such components may include a wireless communications interface. When such components are embodied as an application, the one or more components may be stored on a non-transitory computer-readable medium and executed by the processing device.

Each of network identification system 164, image cataloging system 166 and content feed system 168 may be embodied in hardware, software or combinations thereof. If embodied in software, it should be noted that each block depicted in the flowcharts herein may represent a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

Figure 4:
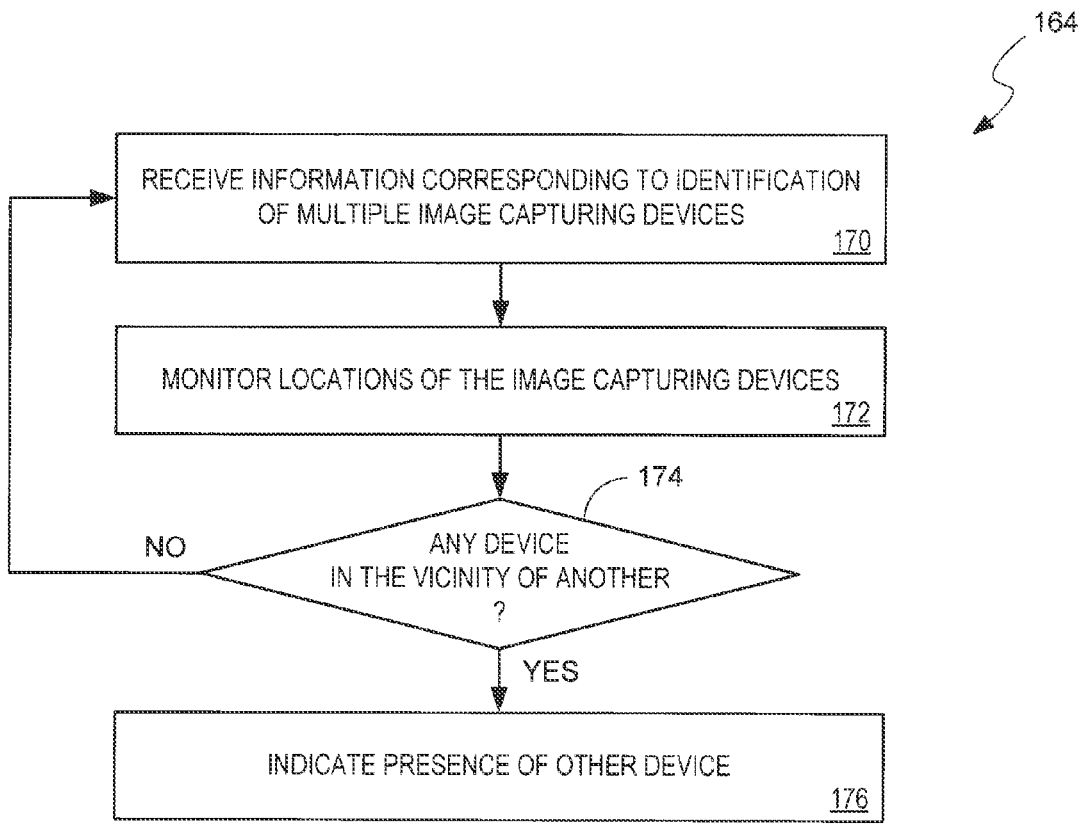
FIG. 4 is a flowchart depicting functionality that may be performed by an example embodiment of a network identification system.

In operation, network identification system 164, image cataloging system 166 and content feed system 168 perform various functions, such as depicted in the following flowcharts. In this regard, FIG. 4 is a flowchart depicting functionality that may be performed by network identification system 164. As shown in FIG. 4, the functionality (or method) may be construed as beginning at block 170, in which information corresponding to the identification of multiple image capturing devices is received. Note that this may serve as a form of registration with an imaging system. In block 172, current locations of the image capturing devices are monitored. Notably, continuous monitoring may be used in some embodiments, whereas less than continuous monitoring (e.g., location information being sent responsive to user actuation, or responsive to camera activation, among others) may be used in other embodiments. Then, as depicted in block 174, a determination is made as to whether any of the devices is in the vicinity of any other of the devices. If so, the process may proceed to block 176, in which information indicating the presence of another image capturing device in the vicinity is provided to each of the corresponding devices. If, however, there are no devices in the vicinity, the process may return to block 170, for example.

Figure 5:
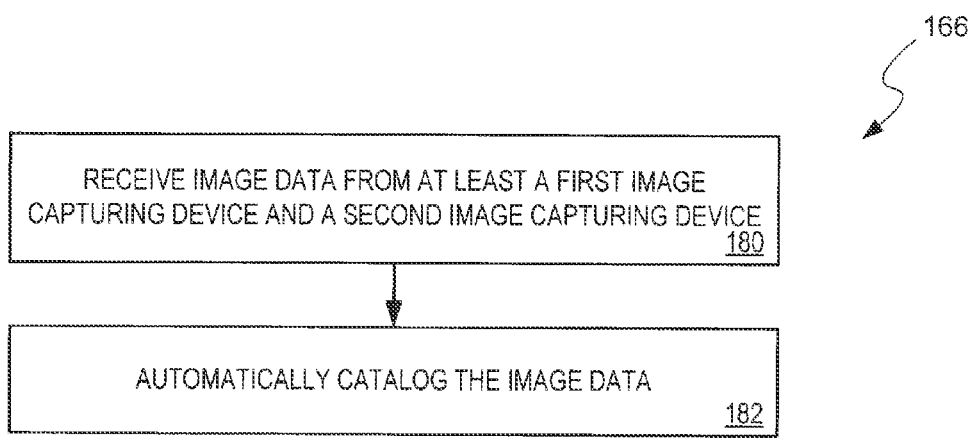
FIG. 5 is a flowchart depicting functionality that may be performed by an example embodiment of an image cataloging system.

FIG. 5 is a flowchart depicting functionality that may be performed by image cataloging system 166. As shown in FIG. 5, the functionality (or method) may be construed as beginning at block 180, in which image data is received from at least a first image capturing device and a second image capturing device. Notably, the devices were identified as operating in the vicinity of each other. In block 182, the received image data is automatically cataloged. In some embodiments, received image data may be accompanied by an indication of content of interest. For instance, various tags or metadata may be associated with the image data. In such an embodiment, responsive to receiving the image data, the content of interest may be used as a criterion for cataloging the image data.

Figure 6:
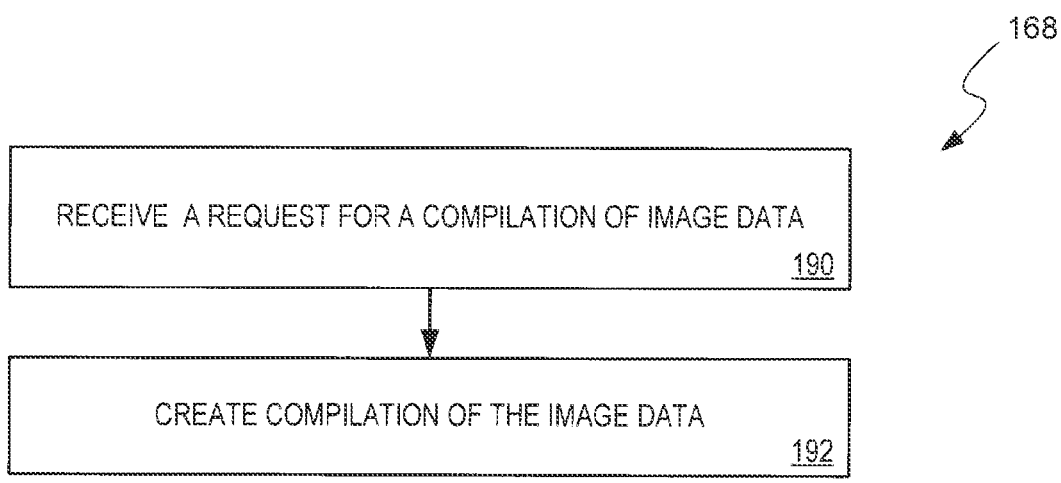
FIG. 6 is a flowchart depicting functionality that may be performed by an example embodiment of a content feed system.

FIG. 6 is a flowchart depicting functionality that may be performed by content feed system 168. As shown in FIG. 6, the functionality (or method) may be construed as beginning at block 190, in which a request for a compilation of image data is received. In some embodiments, such a request may be facilitated via interaction with a user interface of a website associated with the imaging system. In block 192, a compilation of image data is created. In some embodiments, the compilation of image data is created to include at least a portion of the image data received from each of the image capturing devices so that the compilation includes multiple image capture perspectives.

In some embodiments, confidence-level optical recognition may be used to compare a requested dynamic focal point (such as a player in the soccer game example) to a particular feed. Sample frames from each feed may be analyzed against a request image for a match with associated confidence level, with high confidence match segments or entire feeds being added to the user's compilation. In the case of a static focal point (such as a goal at a soccer game or a piano at a recital), the image processing may be similar but with fewer samples per feed given the static nature of the requested focal point.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. An imaging system comprising:
a network identification system operative to identify image capturing devices operating within a vicinity of each other;
an image cataloging system operative to receive image data, via a communication network, from a first image capturing device, associated with a first user, and a second image capturing device, associated with a second user, identified as operating within the vicinity of each other, the image cataloging system being further operative to automatically catalog the received image data; and
a content feed system operative to provide access to the received image data based, at least in part, upon whether a user has provided image data associated with the vicinity to the image cataloging system, wherein the content feed system is operative to receive, via the communication network, a request from the first user for a compilation of image data and, responsive thereto, create the compilation of image data such that the compilation of image data includes at least a portion of the image data received from each of the first image capturing device and the second image capturing device;
the content feed system being further operative to deny access to the image data based on a determination that a user has not provided image data associated with the vicinity to the image cataloging system.

2. The system of claim 1, wherein the network identification system is further operative to provide information to both the first image capturing device and the second image capturing device informing each device of the presence, in the vicinity, of the other device.

3. The system of claim 1, wherein the image cataloging system is further operative to receive an indication of content of interest contained in the image data and, responsive thereto, utilize the content of interest as a criterion for cataloging the image data.

4. The system of claim 3, wherein the content feed system is further operative to form the compilation such that the content of interest is a focal point of the compilation.

5. The system of claim 1, wherein the image cataloging system is further operative to use metadata to catalog the image data.

6. The system of claim 1, wherein the content feed system is further operative to form the compilation by synchronizing image data from the first image capturing device and the second image capturing device.

7. The system of claim 1, wherein the content feed system is further operative to form the compilation by stitching together image data from the first image capturing device and the second image capturing device to form a composite frame of the image data.

8. The system of claim 1, wherein the network identification system is operative to monitor locations of image capturing devices registered therewith to identify the image capturing devices operating within the vicinity of each other.

9. The system of claim 1, further comprising a network interaction system resident on the first image capturing device operative to automatically communicate information corresponding to a current location of the first image capturing device to the network identification system.

10. The system of claim 9, wherein the network interaction system is further operative to automatically communicate image data acquired by the first image capturing device to the image cataloging system.

11. The system of claim 9, wherein the network interaction system is operative to automatically communicate information corresponding to the current location of the first image capturing device to the network identification system responsive to the first image capturing device acquiring image data.

12. A method for providing images comprising:
receiving, via a communication network, first image data corresponding to a subject from a first image capturing device associated with a first user and second image data corresponding to the subject from a second image capturing device associated with a second user;
forming a compilation of image data of the subject containing at least some of the first image data and at least some of the second image data;
providing, via a communication network, the compilation of image data for viewing by the first user and the second user; and
denying access to the compilation of image data to a third user responsive to determining that image data corresponding to the subject was not received, via the communication network, from a third image capturing device associated with the third user.

13. The method of claim 12, further comprising:
determining that the first image capturing device and the second image capturing device are in a vicinity of each other; and
notifying respective users of the first image capturing device and the second image capturing device of the presence of the other responsive to determining that the devices are in the vicinity of each other.

14. The method of claim 12, wherein:
the method further comprises receiving information corresponding to a request for a compilation; and
forming the compilation of image data is performed responsive to receiving the information corresponding to the request.

15. The method of claim 12, wherein forming the compilation of image data comprises synchronizing the first image data and the second image data to create a chronological sequence of image data.

16. The method of claim 12, wherein forming the compilation of image data comprises:
receiving information identifying content within the first image data; and
using the information identifying the content in forming the compilation.

17. The method of claim 12, wherein:
the compilation is a first of multiple compilations; and
the method further comprises forming the multiple compilations with at least two of the multiple compilations exhibiting different sequences of the image data.

18. A method for providing images comprising:
receiving, via a communication network, image data from multiple image capturing devices corresponding to multiple subjects, with each of the multiple image capturing devices being associated with a respective user;
receiving, via the communication network, information corresponding to a request for image data corresponding to a first of the subjects; and
responsive to the request, automatically forming a compilation of image data of the first of the subjects containing image data acquired from at least two of the image capturing devices provided that the request is associated with the user of one of the multiple image capturing devices that provided the image data.

19. The method of claim 18, wherein automatically forming a compilation comprises synchronizing the image data acquired from at least two of the image capturing devices.

20. The method of claim 18, wherein automatically forming a compilation comprises stitching together the image data acquired from at least two of the image capturing devices to form composite frames of the image data.

* * * * *